United States Patent
Takashima et al.

(10) Patent No.: US 12,148,246 B2
(45) Date of Patent: Nov. 19, 2024

(54) FACIAL EXPRESSION LABELING APPARATUS, FACIAL EXPRESSION LABELLING METHOD, AND PROGRAM

(71) Applicant: NIPPON TELEGRAPH AND TELEPHONE CORPORATION, Tokyo (JP)

(72) Inventors: Akihiko Takashima, Tokyo (JP); Ryo Masumura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 371 days.

(21) Appl. No.: 17/777,612

(22) PCT Filed: Nov. 19, 2019

(86) PCT No.: PCT/JP2019/045300
§ 371 (c)(1),
(2) Date: May 17, 2022

(87) PCT Pub. No.: WO2021/100127
PCT Pub. Date: May 27, 2021

(65) Prior Publication Data
US 2022/0406093 A1 Dec. 22, 2022

(51) Int. Cl.
*G06V 40/00* (2022.01)
*G06V 40/16* (2022.01)
(52) U.S. Cl.
CPC .......... *G06V 40/176* (2022.01); *G06V 40/168* (2022.01)

(58) Field of Classification Search
CPC ....... G06V 40/176; G06V 40/168; G06T 7/00
See application file for complete search history.

(56) References Cited

U.S. PATENT DOCUMENTS

| | | | |
|---|---|---|---|
| 2017/0351905 A1* | 12/2017 | Wang | G06V 40/172 |
| 2020/0151439 A1* | 5/2020 | Johnson | G06V 40/166 |
| 2020/0327554 A1* | 10/2020 | Puthran | G06Q 30/016 |

OTHER PUBLICATIONS

Sato et al. (2019) "Facial Expressions of Basic Emotions in Japanese Laypeople" Frontiers in Psychology, vol. 10.

* cited by examiner

*Primary Examiner* — Ping Y Hsieh

(57) ABSTRACT

A facial expression label is assigned to face image data of a person with high accuracy. A facial expression data set storage unit (110) stores a facial expression data set in which the facial expression label is assigned to the face images in which people belonging to various groups show various facial expressions. A facial expression sampling unit (11) acquires a face image in which a person belonging to the desired group shows a desired facial expression. A representative feature quantity calculation unit (12) determines a representative feature quantity for each facial expression label from the face image of the desired group. The target data extraction unit (13) extracts target data from a facial expression data set. A target feature quantity calculation unit (14) calculates a target feature quantity from the target data. A corrected label determination unit (15) determines a corrected label to be assigned to the target data by comparing the target feature quantity and each of the representative feature quantities. The label assignment unit (16) assigns a corrected label to the target data.

15 Claims, 3 Drawing Sheets

FACIAL EXPRESSION LABELING APPARATUS, FACIAL EXPRESSION LABELLING METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/045300, filed on 19 Nov. 2019, the disclosure of which is hereby incorporated herein by reference in its entirety.

TECHNICAL FIELD

The present invention relates to a technique for assigning a label representing a facial expression to a face image of a person.

BACKGROUND ART

In recent years, in a facial expression recognition technique that classifies facial expressions from face images of people, there is a general method for annotating facial expression labels to large amounts of face images and constructing a facial expression recognition model by using machine learning. As a method for classifying facial expressions, for example, there is a classification method based on six basic emotions of anger, disgust, fear, enjoyment, sadness, and surprise. The most accurate annotation method is a method in which an annotator visually classifies facial expressions for each of the face images collected from, for example, the Internet, television shows, and the like. In the method, a method for performing annotation with reference to a theory proposed by Ekman is general. In Ekman's theory, a combination of action contents for each of sites such as an eyebrow, eyes, a nose, a mouth, and the like in the face image and emotions are mapped.

CITATION LIST

Non Patent Literature

NPL 1: Wataru Sato, Sylwia Hyniewska, Kazusa Minemoto, and Sakiko Yoshikawa, "Facial Expressions of Basic Emotions in Japanese Laypeople," Frontiers in Psychology, 10: 259, 2019.

SUMMARY OF THE INVENTION

Technical Problem

In Ekman's theory, an emotion and appearance of a facial expression expressed by the emotion are the same regardless of culture, race, and the like. However, in recent years, it has been found that there is a difference between the facial expressions of Japanese and facial expressions of Westerners. For example, as a result of eliciting 65 Japanese to show six basic facial expressions, the results were that the facial expressions suggested by Ekman do not include the four expressions of anger, fear, sadness, and disgust among six basic facial expressions (see NPL 1). Specifically, deformation sites of a face differ between Japanese and Westerner, or the degree of deformation of the face is small in Japanese. When annotation is performed on the facial expression of Japanese, the facial expression cannot be discriminated clearly and visually unlike Ekman's theory. Therefore, there is a problem that a wrong label is assigned or a label is assigned to an emotionless facial expression even though the facial expression originally shows sadness.

An object of the present invention is to assign a facial expression label with high accuracy with respect to a face image of a person belonging to a particular group in view of the technical problems as described above.

Means for Solving the Problem

In order to solve the above problems, according to an aspect of the present invention, there is provided a facial expression label assignment apparatus including: a facial expression data set storage unit that stores a facial expression data set in which a facial expression label representing a facial expression of a face image is assigned to a plurality of face images in which a plurality of people including at least a person belonging to a desired group show any facial expression among a plurality of predetermined facial expressions; a representative feature quantity calculation unit that calculates a representative feature quantity for each of the facial expression labels of the desired group based on a facial expression feature quantity calculated from the face image of the person belonging to the desired group; a target data extraction unit that extracts target data that is the face image of the person belonging to the desired group from the facial expression data set; a target feature quantity calculation unit that calculates a target feature quantity that is a facial expression feature quantity calculated from the target data; a corrected label determination unit that determines a corrected label that is a facial expression label assigned to the target data by comparing the target feature quantity with each of the representative feature quantities of the desired group; and a label assignment unit that assigns the corrected label to the target data.

Effects of the Invention

According to an aspect of the present invention, it is possible to assign the facial expression label with high accuracy with respect to the face image of the person belonging to the particular group. By machine learning using the data to which the facial expression label is assigned, it is possible to construct a robust facial expression recognition model for the facial expression of the person belonging to the particular group.

DESCRIPTION OF EMBODIMENTS

Figure 1:
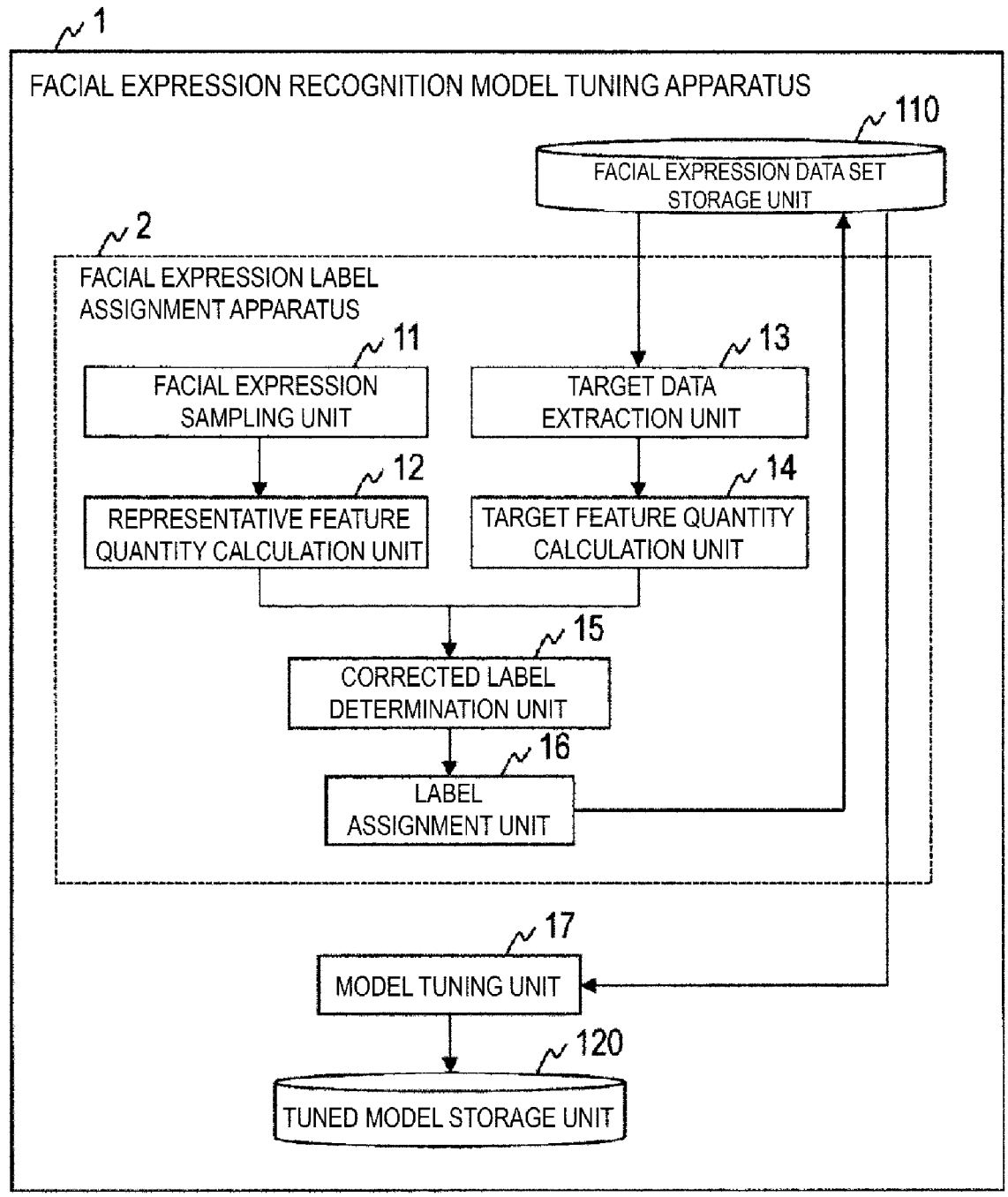
FIG. 1 is a diagram illustrating a functional configuration of a facial expression recognition model tuning apparatus.

Hereinafter, an embodiment of the present invention will be described in detail. The same reference numerals are given to constituent elements having the same functions in the drawings, and repeated description will be omitted.

In the embodiment, when assigning a facial expression label to a Japanese face image, a framework is incorporated in which a facial expression label to be assigned is automatically assigned in accordance with a feature quantity (hereinafter, referred to as "facial expression feature quantity") representing a facial expression calculated from a face image in advance, without performing annotation based on appearance with reference to Ekman's theory's theory. As the facial expression feature quantity, action units (AU) data that indicates an action pattern of a facial expression suggested in a facial action coding system (FACS) is used (see Reference 1).

[Reference 1] Kazuto Terada, Kooji Hanada, "Facial expressions and computer graphics", Niigata Dental Journal, Vol. 30 (1), pp. 75-76, 2000-07

The AU data is for classifying a movement of each site of a facial surface showing the facial expression into approximately 44 types, and giving 0 to 5 strength information (representing high intensity as it is higher) to the classified movements, respectively. However, the feature quantity that can be used in the present invention is not limited to the AU data, and any feature quantity capable of discriminating the facial expression may be used. For example, a facial landmark configured of information representing a position of each site of the face can be used as the facial expression feature quantity.

Furthermore, in the embodiment, the configuration in which the facial expression label is assigned to the Japanese face image, but the object of the present invention is not limited to Japanese, and a particular group that has been found to show a facial expression different from the facial expression suggested in Ekman's theory in the related art can be similarly treated as an object. A grouping criterion is not limited to race or nationality, and may be a criterion based on any objectively recognizable attribute.

In the embodiment, first, the representative AU data for each facial expression label of Japanese is calculated. Next, a distance, such as cosine similarity, between the AU data calculated from the Japanese face image, which is training data, and the representative AU data for each facial expression label is acquired. Then, the facial expression label corresponding to the representative AU data of which a distance from the AU data of the training data is the shortest is assigned to the face image of the training data.

The facial expression recognition model tuning apparatus of the embodiment is an information processing apparatus that tunes a facial expression recognition model that outputs a facial expression label representing the facial expression when the face image is input by using a facial expression data set in which the facial expression label representing the facial expression is assigned to the face image in which people belonging to various groups show facial expressions. As illustrated in FIG. 1, a facial expression recognition model tuning apparatus 1 of the embodiment includes a facial expression data set storage unit 110, a facial expression sampling unit 11, a representative feature quantity calculation unit 12, a target data extraction unit 13, a target feature quantity calculation unit 14, a corrected label determination unit 15, a label assignment unit 16, a model tuning unit 17, and a tuned model storage unit 120. A facial expression recognition model tuning method of the embodiment is implemented by this facial expression recognition model tuning apparatus 1 performing processing of each step illustrated in FIG. 2.

The facial expression recognition model tuning apparatus 1 is a special apparatus constituted by, for example, a known or dedicated computer including a central processing unit (CPU), a main storage unit (random access memory (RAM)), and the like into which a special program is read. The facial expression recognition model tuning apparatus 1, for example, executes each processing under control of the central processing unit. Data input to the facial expression recognition model tuning apparatus 1 and data obtained in each processing are, for example, stored in the main storage unit, and the data stored in the main storage unit is read out, as needed, to the central processing unit to be used for other processing. At least a part of each processing unit of the facial expression recognition model tuning apparatus 1 may be constituted with hardware such as an integrated circuit. Each storage unit included in the facial expression recognition model tuning apparatus 1 can be constituted with, for example, a main storage unit such as a random access memory (RAM), an auxiliary storage unit constituted with a hard disk, an optical disk, or a semiconductor memory element such as a flash memory, or a middleware such as a relational database or a key-value store.

Figure 2:
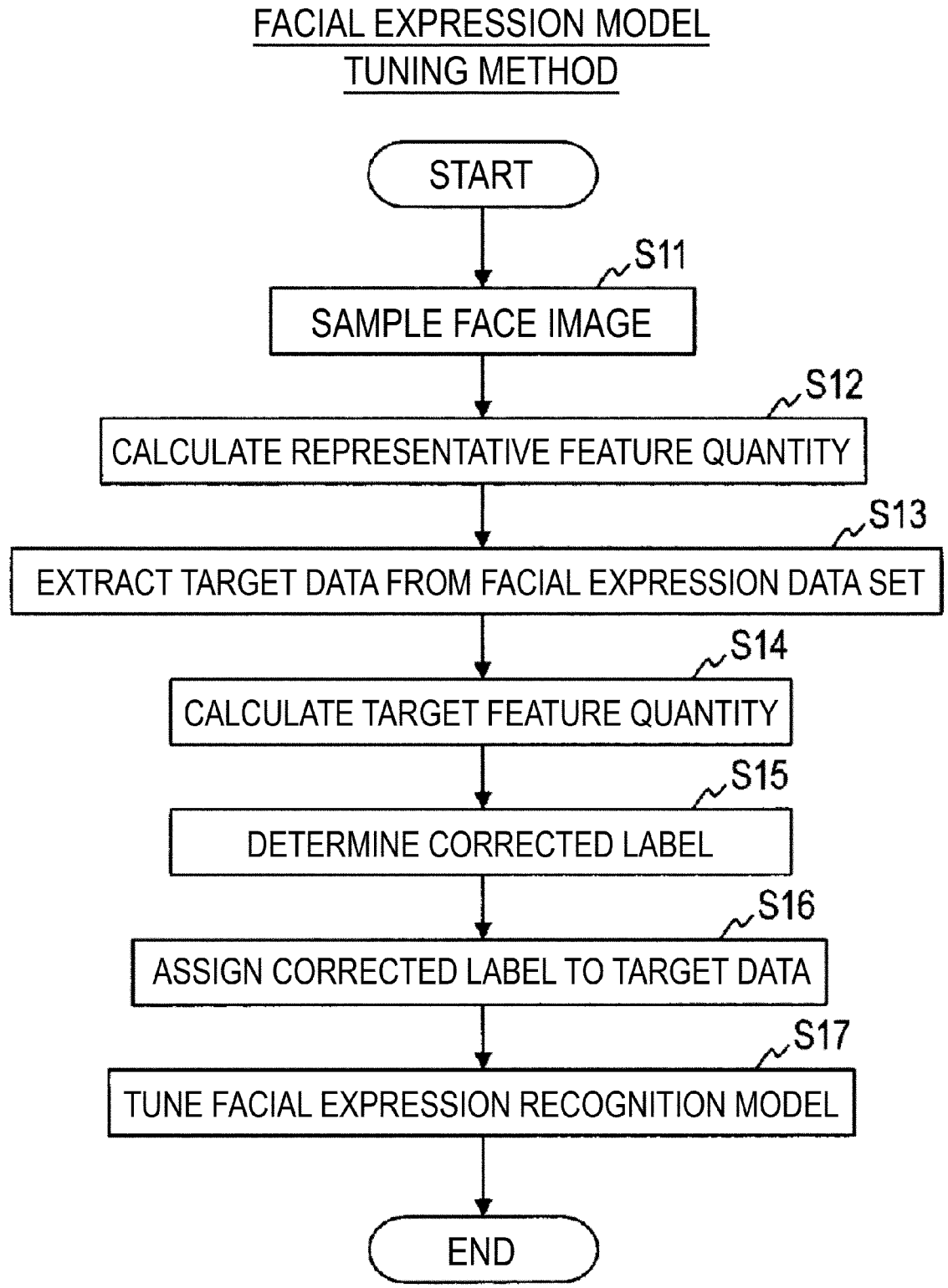
FIG. 2 is a flowchart illustrating a processing procedure of a facial expression recognition model tuning method.

A processing procedure of the facial expression recognition model tuning method executed by the facial expression recognition model tuning apparatus 1 of the embodiment will be described with reference to FIG. 2.

The facial expression data set storage unit 110 stores a pre-correction facial expression data set in which a facial expression label representing a facial expression of each face image is assigned to a plurality of the face images in which various race of people including Japanese show various predetermined facial expressions. The facial expression label may be determined by the person visually determining the facial expression of the face image based on Ekman's theory as in the related art, or may be determined by other known techniques.

In Step S11, the facial expression sampling unit 11 samples the Japanese face image for each facial expression label. As a sampling method, for example, the subject is instructed to show a facial expression corresponding to each facial expression label, and the face at that time is imaged to acquire the face image. As a method for instructing the subject to show the facial expression, for example, the method may be a method for instructing the subject to show only the facial expression corresponding to the facial expression label, such as "Please show a facial expression of surprise", or a method for instructing the subject to show a facial expression by giving a scenario that evokes emotional experience, such as "Please show a facial expression of surprise when lightning strikes nearby". The number of the subjects is, for example, approximately 50. Kinds of the facial expression label are, for example, six basic facial expressions, but are not limited to this, and may be freely defined. The facial expression sampling unit 11 generates a sample data set by combining the face image sampled in the method described above and the facial expression label, and outputs the sample data set to the representative feature quantity calculation unit 12.

A format of the sample data set is, for example, "face image of facial expression 1 of subject 1: facial expression label; face image of facial expression 2 of subject 1: facial expression label, . . . ; face image of facial expression n of subject 1: facial expression label; face image of facial expression 1 of subject 2: facial expression label; face image of facial expression 2 of subject 2: facial expression label, . . . ; face image of facial expression n of subject 2: facial expression label, . . . ; face image of facial expression 1 of subject X: facial expression label; face image of facial expression 2 of subject X: facial expression label, . . . ; and face image of facial expression n of subject X: facial expression label". Where X is the number of the subjects and n is the number of the facial expression labels.

In step S12, the representative feature quantity calculation unit 12 receives the sample data set from the facial expression sampling unit 11, and calculates the AU data representing the facial expression label for each facial expression label (hereinafter, referred to as "representative AU data"). First, the AU data is assigned to all the face images included in the sample data set. The method for assigning the AU data may be a method for manually labeling the AU data, or a method using an existing AU detector. Next, the representative AU data is calculated for each face image by using the AU data of each facial expression label. As the method for calculating the representative AU data, for example, there is a method for acquiring an average value of the AU data calculated from the face images of all the subjects for each facial expression label. The representative feature quantity calculation unit 12 outputs the calculated representative AU data to the corrected label determination unit 15.

A format of the representative AU data is, for example, "facial expression 1: AU data (vector), facial expression 2: AU data (vector), . . . , facial expression n: AU data (vector)".

In step S13, the target data extraction unit 13 extracts the Japanese face image from the pre-correction facial expression data set stored in the facial expression data set storage unit 110. As an extraction method, a recognizer that determines a Japanese face previously learned may be used, and the Japanese face image may be manually selected. The target data extraction unit 13 outputs the extracted Japanese face image to the target feature quantity calculation unit 14.

In Step S14, the target feature quantity calculation unit 14 receives the Japanese face image from the target data extraction unit 13, and assigns the AU data (hereinafter, referred to as "target AU data") to all the face images. The method for assigning the AU data is the same as that of the representative feature quantity calculation unit 12. The target feature quantity calculation unit 14 outputs the calculated target AU data to the corrected label determination unit 15.

In Step S15, the corrected label determination unit 15 receives the representative AU data from the representative feature quantity calculation unit 12, receives the target AU data from the target feature quantity calculation unit 14, and determines the facial expression label (hereinafter, also referred to as "corrected label") that is assigned to the Japanese face image extracted by the target data extraction unit 13. First, the target AU data corresponding to certain Japanese face image is compared with each representative AU data for each facial expression label, and the facial expression label corresponding to the representative AU data closest to the target AU data is determined as the corrected label. The comparison method may be, for example, any method that measures a distance between vectors, such as cosine similarity. The corrected label determination unit 15 determines the corrected label for all the Japanese face images extracted by the target data extraction unit 13, and outputs the corrected label to the label assignment unit 16.

In Step S16, the label assignment unit 16 receives the corrected label from the corrected label determination unit 15, and overwrites the facial expression label assigned to the Japanese face image stored in the facial expression data set storage unit 110 with the corrected label. In a case where the facial expression label is not assigned to the face image, the corrected label is only required to be newly assigned to the face image. The label assignment unit 16 stores, in the facial expression data set storage unit 110, a post-correction facial expression data set in which the corrected label is assigned to the Japanese face image among the pre-correction facial expression data sets.

In Step S17, by using the post-correction facial expression data set stored in the facial expression data set storage unit 110, the model tuning unit 17 tunes the facial expression recognition model that outputs the facial expression label representing the facial expression when the face image is input. As a model architecture, for example, VGG16 generally used in image recognition may be used. The model tuning unit 17 stores the tuned facial expression recognition model in the tuned model storage unit 120.

In the embodiment, the facial expression recognition model tuning apparatus that tunes the facial expression recognition model from the facial expression data set in which the facial expression label is assigned to the face image has been described, but a part of the facial expression recognition model tuning apparatus may be cut out to configure an facial expression label assignment apparatus that corrects the facial expression label assigned to the face image into a more appropriate facial expression label. In this case, as illustrated in FIG. 1, a facial expression label assignment apparatus 2 may include only the facial expression sampling unit 11, the representative feature quantity calculation unit 12, the target data extraction unit 13, the target feature quantity calculation unit 14, the corrected label determination unit 15, and the label assignment unit 16 among the processing units included in the facial expression recognition model tuning apparatus 1. The facial expression label assignment apparatus 2 outputs the post-correction facial expression data set in which the facial expression label assigned to the Japanese face image is corrected when the pre-correction facial expression data set in which the facial expression label representing the facial expression is assigned to the face images of various races is input.

Although the embodiments of the present invention have been described above, a specific configuration is not limited to the embodiments, and appropriate changes in the design are, of course, included in the present invention within the scope of the present invention without departing from the gist of the present invention. The various kinds of processing described in the embodiments are not only implemented in the described order in a time-series manner but may also be implemented in parallel or separately as necessary or in accordance with a processing capability of the apparatus which performs the processing.

Program and Recording Medium

Figure 3:
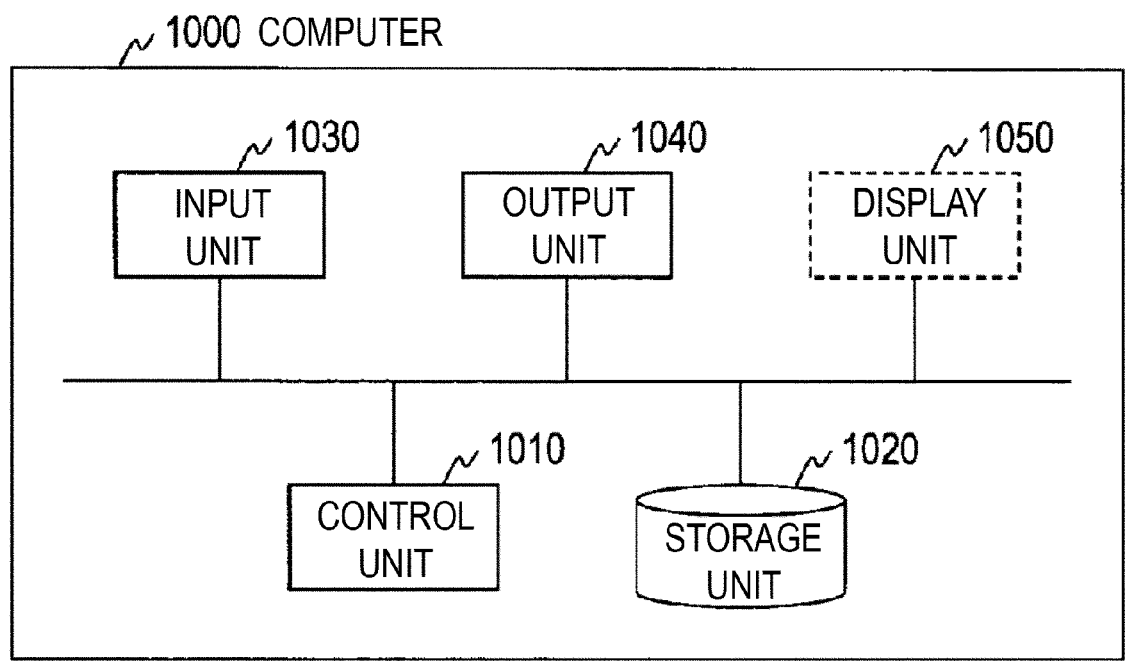
FIG. 3 is a diagram illustrating a functional configuration of a computer.

In a case where various processing functions in each apparatus described in the foregoing embodiment are implemented by a computer, processing details of the functions that each apparatus should have are described by a program. By causing this program to be read into a storage unit 1020 of the computer illustrated in FIG. 3 and causing a control unit 1010, an input unit 1030, an output unit 1040, and the like to operate, various processing functions of each of the apparatuses described above are implemented on the computer.

The program in which the processing details are described can be recorded on a computer-readable recording medium. The computer-readable recording medium, for example, may be any type of medium such as a magnetic recording device, an optical disc, a magneto-optical recording medium, or a semiconductor memory.

Furthermore, the program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed.

For example, such a computer executing the program first temporarily stores the program recorded on the portable recording medium or the program transmitted from the server computer in its own storage device. When executing the processing, the computer reads the program stored in its own storage device and executes the processing in accordance with the read program. Furthermore, as another execution mode of this program, the computer may directly read the program from the portable recording medium and execute processing in accordance with the program, or, further, may sequentially execute the processing in accordance with the received program each time the program is transmitted from the server computer to the computer. Furthermore, another configuration to execute the processing through a so-called application service provider (ASP) service in which processing functions are implemented only by issuing an instruction to execute the program and obtaining results without transmitting the program from the server computer to the computer may be employed. Note that, the program in this mode is assumed to include information which is provided for processing of a computer and is equivalent to a program (data or the like that has characteristics of regulating processing of the computer rather than being a direct instruction to the computer).

Furthermore, in this mode, the apparatus is configured by executing a predetermined program on a computer, but at least a part of the processing details may be implemented by hardware.

The invention claimed is:

1. A facial expression label assignment apparatus comprising a processor configured to execute a method comprising:
   storing a facial expression data set in which a facial expression label representing a facial expression of a face image is assigned to a plurality of face images in which a plurality of people including at least a person belonging to a desired group show any facial expression among a plurality of predetermined facial expressions;
   calculating a representative feature quantity for each of the facial expression labels of the desired group based on a facial expression feature quantity calculated from the face image of the person belonging to the desired group;
   extracting target data that is the face image of the person belonging to the desired group from the facial expression data set;
   calculating a target feature quantity that is a facial expression feature quantity calculated from the target data;
   determining a corrected label that is a facial expression label assigned to the target data by comparing the target feature quantity with each of a plurality of representative feature quantities of the desired group; and
   assigning the corrected label to the target data.

2. The facial expression label assignment apparatus according to claim 1, wherein the facial expression feature quantity includes information representing strength of an action of each site of a facial surface of the person.

3. The facial expression label assignment apparatus according to claim 2, wherein the determining further includes, as the corrected label, a facial expression label corresponding to a representative feature quantity of which a distance from the target feature quantity is the shortest among the representative feature quantities of the desired group.

4. The facial expression label assignment apparatus according to claim 1, wherein the facial expression label includes at least one of: anger, disgust, fear, enjoyment, sadness, or surprise.

5. The facial expression label assignment apparatus according to claim 1, wherein the representative feature quantity includes action units data indicating an action pattern of a facial expression based on movement of each of a plurality of sites of a facial surface showing the facial expression.

6. A method for assigning a facial expression label, the method comprising:
   storing a facial expression data set in which a facial expression label representing a facial expression of a face image is assigned to a plurality of face images in which a plurality of people including at least a person belonging to a desired group show any facial expression among a plurality of predetermined facial expressions;
   calculating a representative feature quantity for each of the facial expression labels of the desired group based on a facial expression feature quantity calculated from the face image of the person belonging to the desired group;
   extracting target data that is the face image of the person belonging to the desired group from the facial expression data set;
   calculating a target feature quantity that is a facial expression feature quantity calculated from the target data;
   determining a corrected label that is a facial expression label assigned to the target data by comparing the target feature quantity with each of a plurality of representative feature quantities of the desired group; and
   assigning the corrected label to the target data.

7. The method according to claim 6, wherein the facial expression feature quantity includes information representing strength of an action of each site of a facial surface of the person.

8. The method according to claim 7, wherein the determining further includes, as the corrected label, a facial expression label corresponding to a representative feature quantity of which a distance from the target feature quantity is the shortest among the representative feature quantities of the desired group.

9. The method according to claim 6, wherein the facial expression label includes at least one of: anger, disgust, fear, enjoyment, sadness, or surprise.

10. The method according to claim 4, wherein the representative feature quantity includes action units data indicating an action pattern of a facial expression based on movement of each of a plurality of sites of a facial surface showing the facial expression.

11. A computer-readable non-transitory recording medium storing computer-executable program instructions that when executed by a processor cause a computer system to execute a method comprising:
   storing a facial expression data set in which a facial expression label representing a facial expression of a face image is assigned to a plurality of face images in which a plurality of people including at least a person belonging to a desired group show any facial expression among a plurality of predetermined facial expressions;
   calculating a representative feature quantity for each of the facial expression labels of the desired group based on a facial expression feature quantity calculated from the face image of the person belonging to the desired group;
   extracting target data that is the face image of the person belonging to the desired group from the facial expression data set;

calculating a target feature quantity that is a facial expression feature quantity calculated from the target data;

determining a corrected label that is a facial expression label assigned to the target data by comparing the target feature quantity with each of a plurality of representative feature quantities of the desired group; and assigning the corrected label to the target data.

12. The computer-readable non-transitory recording medium according to claim 11, wherein the facial expression feature quantity includes information representing strength of an action of each site of a facial surface of the person.

13. The computer-readable non-transitory recording medium according to claim 12, wherein the determining further includes, as the corrected label, a facial expression label corresponding to a representative feature quantity of which a distance from the target feature quantity is the shortest among the representative feature quantities of the desired group.

14. The computer-readable non-transitory recording medium according to claim 11, wherein the facial expression label includes at least one of: anger, disgust, fear, enjoyment, sadness, or surprise.

15. The computer-readable non-transitory recording medium according to claim 11, wherein the representative feature quantity includes action units data indicating an action pattern of a facial expression based on movement of each of a plurality of sites of a facial surface showing the facial expression.

* * * * *